(12) United States Patent
Bailey et al.

(10) Patent No.: US 8,805,750 B2
(45) Date of Patent: Aug. 12, 2014

(54) PROVIDING COMPARISON EXPERIENCES IN RESPONSE TO SEARCH QUERIES

(75) Inventors: Peter Bailey, Kirkland, WA (US); Liwei Chen, Seattle, WA (US); Sanaz Ahari, Bellevue, WA (US); Nipoon Malhotra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 12/641,531

(22) Filed: Dec. 18, 2009

(65) Prior Publication Data

US 2011/0153528 A1    Jun. 23, 2011

(51) Int. Cl.
*G06F 15/18*      (2006.01)
(52) U.S. Cl.
USPC .............................. 706/12; 707/723; 707/769
(58) Field of Classification Search
USPC .................... 706/12; 707/723, 769
See application file for complete search history.

(56) References Cited

U.S. PATENT DOCUMENTS

| | | | |
|---|---|---|---|
| 5,983,237 A | 11/1999 | Jain et al. | |
| 7,548,910 B1 | 6/2009 | Chu et al. | |
| 8,121,901 B2* | 2/2012 | Blanchard et al. | 705/26.1 |
| 2002/0107861 A1* | 8/2002 | Clendinning et al. | 707/101 |
| 2009/0012778 A1 | 1/2009 | Feng et al. | |
| 2009/0019002 A1 | 1/2009 | Boulis | |
| 2009/0164453 A1 | 6/2009 | Rothman | |
| 2009/0222445 A1 | 9/2009 | Tavor | |
| 2010/0169338 A1* | 7/2010 | Kenedy et al. | 707/758 |
| 2010/0306223 A1* | 12/2010 | Lee et al. | 707/759 |
| 2011/0093452 A1* | 4/2011 | Jain | 707/723 |

OTHER PUBLICATIONS

"Predictive user click models based on click-through history", Benjamin Piwowarski, Hugo Zaragoza, Proceeding CIKM, 2007, Proceedings of the sixteenth ACM conference on Conference on information and knowledge management, pp. 175-182.*
White, Ryen W., Bailey, Peter and Chen, Liwei, "Predicting User Interests from Contextual Information," Jul. 19-23, 2009, 8 pp., http://research.microsoft.com/en-us/um/people/ryenw/papers/WhiteSIGIR2009.pdf.
Li, Xiao, Wang, Ye-Yi and Acero, Alex, "Learning Query Intent from Regularized Click Graphs," Published Date: Jul. 20-24, 2008, 8 pp. http://research.microsoft.com/en-us/um/people/xiaol/papers/sigir2008.pdf.
Zhou, Qi, et al. "Spark: Adapting Keyword Query to Semantic Search,"—Published Date: 2007, 14 pp., http://iswc2007.semanticweb.org/papers/687.pdf.

* cited by examiner

*Primary Examiner* — Kakali Chaki
*Assistant Examiner* — Mai T Tran
(74) *Attorney, Agent, or Firm* — Dave Ream; Doug Barker; Micky Minhas (57) ABSTRACT

Computer-readable media, computer systems, and computing devices facilitate providing a comparison experience to a user in response to a search query. Upon receiving a search query from the user, entities are extracted from the query. The entities are associated with entity classes. The entities, entity classes, previous user behavior, and other information are used to infer whether the user likely is engaging in a comparison task. If the inference indicates that the user likely is engaging in a comparison task, a comparison experience is generated and access to the comparison experience is provided to the user.

20 Claims, 7 Drawing Sheets

PROVIDING COMPARISON EXPERIENCES IN RESPONSE TO SEARCH QUERIES

BACKGROUND

Computer users often submit search requests to search services in an attempt to access information about products, places, people, and the like so that the users can compare the accessed information with information about similar products, places, people, and the like. Often, a user must access a set of information and save or print the information so that the user can refer to the information when making a comparison. Although some websites, generally associated with manufacturers and retailers, may provide options for comparing like products, most search services currently do not provide such services.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide for automatically generating and providing a comparison experience to a user in response to determining that the user likely is engaging in a comparison task when the user submits a search query to a search service. A comparison task can include an activity in which the user engages to compare attributes corresponding to two or more entities such as products, places, destinations, services, and the like. According to embodiments, determining whether a user likely is engaging in a comparison task includes determining whether the search query includes an explicit comparison call, which is one or more keywords that a user submits in an explicit attempt to retrieve comparison information. If the query does not include an explicit comparison call, an implicit analysis can be performed. According to embodiments of the invention, an implicit analysis involves analyzing entities extracted from the search query in conjunction with user history and other information to calculate a confidence interval representing a likelihood that the user is engaging in a comparison task.

In various embodiments of the invention, the level of confidence that a user likely is engaging in a comparison activity can be used to determine whether to provide a comparison experience automatically to the user, whether to provide a non-intrusive hook into a comparison experience on a search results page, or whether to provide a search results page with no specific comparison experience. In some embodiments, a comparison experience includes comparison information, which can be subjective and/or objective. The comparison information can be presented, for example, in a side-by-side display. In embodiments, comparison information can be represented by text, charts, tables, graphs, images, and other types of information. In some embodiments, the user can configure the appearance of the comparison experience as well.

BRIEF DESCRIPTION OF THE DRAWINGS

Embodiments of the inventions are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention described herein include computing devices and computer-readable media for causing computing devices associated with a search service to perform methods for providing a comparison experience to a user in response to a search query. In a first illustrative embodiment, a set of computer-executable instructions provides an exemplary method of providing a comparison experience. Embodiments of the method include receiving a search query from a user and determining that the user likely is engaging in a comparison task. Upon determining that the user likely is engaging in a comparison task, embodiments of the exemplary method include providing a comparison experience to the user.

In a second illustrative embodiment, a computing device associated with a search service provider facilitates providing a computer-implemented system that provides comparison experiences. The computing device includes a system bus; a communication connection coupled to the system bus for connecting a network to the system bus such that a user computing device can communicate with the computing device associated with the search service via the network; a processor coupled to the system bus; and a memory coupled to the system bus. In embodiments, the memory stores computer-executable instructions that, when executed by the processor, cause the computing device to implement a number of components. According to various embodiments, the components include an entity extraction component that extracts entities from search queries; a classification component that associates entities to entity classes; an inference component that determines a likelihood that the a user is engaging in a comparison task based on a submitted search query and other information; and a comparison experience component that generates a comparison experience and provides the user access to the comparison experience.

In a third illustrative embodiment, a set of computer-executable instructions provides an exemplary method of providing a comparison experience in response to a search query. According to embodiments of the invention, the exemplary method receiving a first search query from a user; extracting a first entity from the first search query; updating an entity dictionary with data regarding the first entity, and associating the first entity with a first entity class. In embodiments, the exemplary method further includes receiving a second search query from the user; extracting a second entity from the second search query and associating the second entity with the first entity class. According to an embodiment, if the first entity and second entity are not the same entity, the exemplary method further includes generating a comparison experience and providing the comparison experience to the user.

Various aspects of embodiments of the invention may be described in the general context of computer program products that include computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplate media readable by a database, a processor, and various other networked computing devices. By way of example, and not limitation, computer-readable media include media implemented in any method or technology for storing information. Examples of stored information include computer-executable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
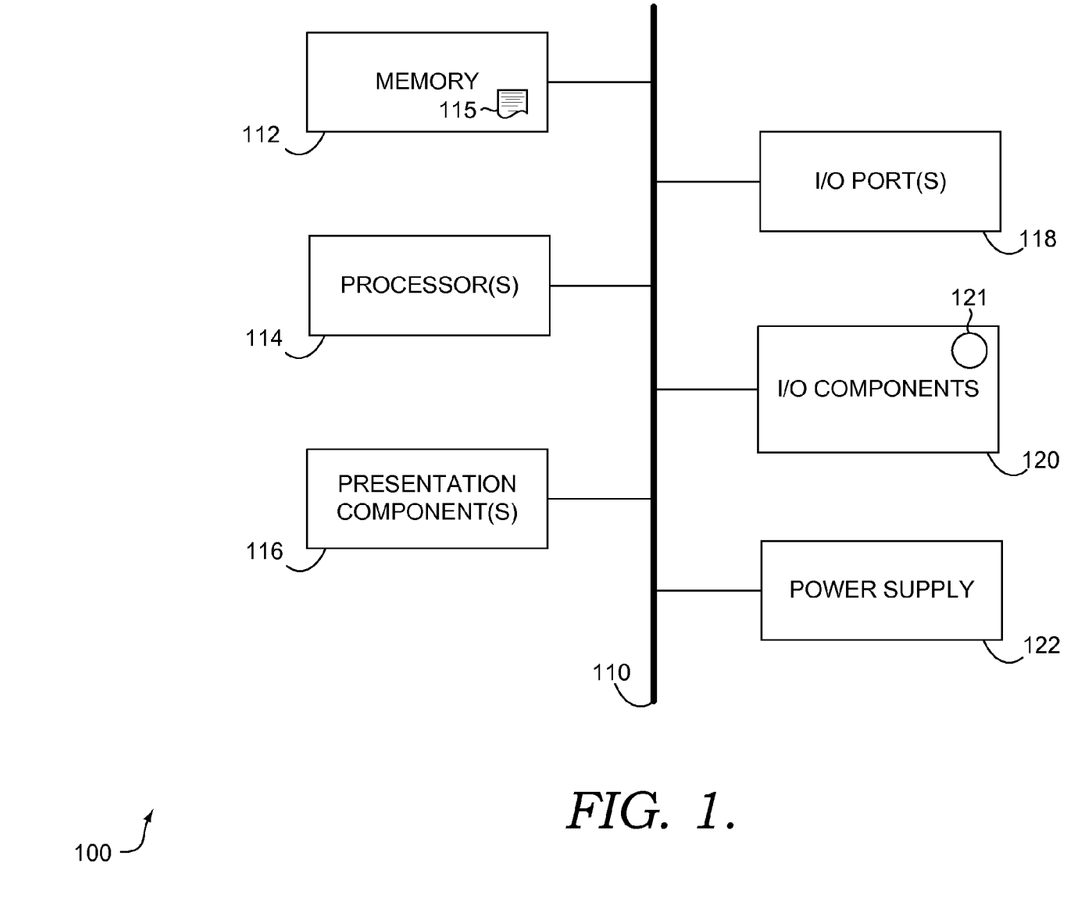
FIG. 1 is a block diagram of an exemplary computing device suitable for implementing embodiments of the invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Memory 112 includes computer-executable instructions 115 stored in volatile and/or nonvolatile memory. The memory may be removable, nonremovable, or a combination thereof. Exemplary hardware devices include solid-state memory, hard drives, optical-disc drives, etc. Computing device 100 includes one or more processors 114 coupled with system bus 110 that read data from various entities such as memory 112 or I/O components 120. In an embodiment, the one or more processors 114 execute the computer-executable instructions 115 to perform various tasks and methods defined by the computer-executable instructions 115. Presentation component(s) 116 are coupled to system bus 110 and present data indications to a user or other device. Exemplary presentation components 116 include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse. I/O components 120 can also include communication connections 121 that can facilitate communicatively connecting the computing device 100 to remote devices such as, for example, other computing devices, servers, routers, and the like.

Figure 2:
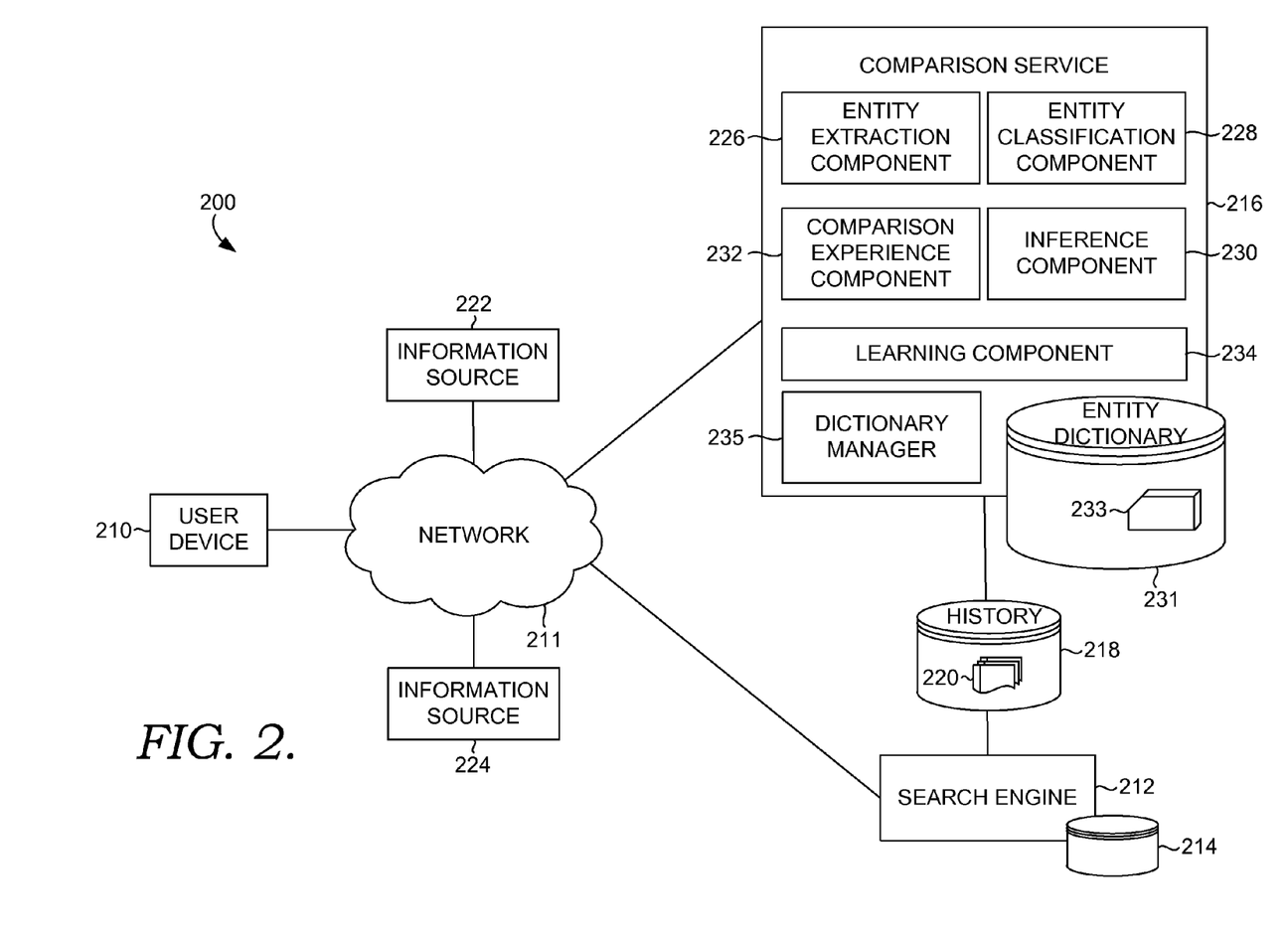
FIG. 2 is a block diagram of an exemplary network environment suitable for use in implementing embodiments of the invention.

Turning now to FIG. 2, a block diagram of an exemplary network environment 200 suitable for use in implementing embodiments of the inventions is shown. Network environment 200 includes user device 210, network 211, search engine 212, comparison service 216, and history 218. User device 210 communicates with search engine 212 and comparison service 216 through network 211, which may include any number of networks such as, for example, a local area network (LAN), a wide area network (WAN), the Internet, a cellular network, a peer-to-peer (P2P) network, a mobile network, or a combination of networks. The exemplary network environment 200 shown in FIG. 2 is an example of one suitable network environment 200 and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein.

User device 210 can be any kind of computing device capable of allowing a user to submit a search query to search engine 212 and to receive, in response to the search query, a search results page from the search engine 212. For example, in an embodiment, user device 210 can be a computing device such as computing device 100, as described above with reference to FIG. 1. In embodiments, user device 210 can be a personal computer (PC), a laptop computer, a workstation, a mobile computing device, a PDA, a cell phone, or the like.

Search engine 212, as well as any or all of the other components 216, 218 illustrated in FIG. 2 may be implemented as server systems, program modules, virtual machines, components of a server or servers, networks, and the like. In one embodiment, for example, each of the components 212, 216, and 218 is implemented as a separate server. In another embodiment, all of the components 212, 216, and 218 are implemented on a single server or a bank of servers.

In an embodiment, user device 210 is separate and distinct from search engine 212 and/or the other components illustrated in FIG. 2. In another embodiment, user device 210 is integrated with one or more of components 212, 216, or 218. For clarity of explanation, we shall describe embodiments in which each of user device 210, and components 216 and 218 are separate while understanding that this may not be the case in various configurations contemplated within the present invention.

As shown in FIG. 2, user device 210 communicates with search engine 212. Search engine 212 receives search queries, i.e., search requests, submitted by a user via user device 210. Search queries received from a user can include search queries that were manually or verbally inputted by the user, queries that were suggested to the user and selected by the user, and any other search queries received by the search engine 212 that were somehow approved by the user. Search engine 212 may be or include, for example, a search engine, a crawler, or the like. Search engine 212, in some embodiments, is configured to perform a search using a query submitted through user device 210. In various embodiments, search engine 212 can provide a user interface for facilitating a search experience for a user communicating with user device 210. In an embodiment, search engine 212 monitors searching activity, and can produce one or more records or logs representing search activity, previous queries submitted, search results obtained, and the like. These services can be leveraged to improve the searching experience in many different ways.

As illustrated in FIG. 2, search engine 212 communicates with a comparison service 216 and a history 218. In an embodiment of the present invention, when search engine 212 receives a search query from user device 210, search engine 212 forwards that query to each of comparison service 216 and history 218. In some embodiments, the copies of the submitted query are forwarded simultaneously to each of the other components, and in other embodiments, the copies are forwarded at different times.

In other embodiments, the information forwarded from search engine 212 to one or more of comparison service 216 and history 218 are not copies of the original submitted query. In an embodiment, different information is forwarded to each of two or more of components 216 and 218. The information can be targeted particularly at the service or services offered and/or performed by a particular server. For example, in one embodiment, a copy of the submitted query is forwarded to the comparison service 216, while information sufficient to notify history 218 that a particular type of data should be recorded is forwarded to history 218.

In an embodiment, search engine 212 is configured to receive a submitted query and to use the query to perform a search. In an embodiment, upon discovering query results that satisfy the submitted query, search engine 212 returns the query results to user device 210 by way of a graphical interface maintained by search engine 212. Query results can include content of any kind such as, for example, a list of documents, files, or other instances of content that satisfy the submitted query. In another embodiment, query results include the actual content that satisfies the submitted query. In still further embodiments, query results include links to content, suggestions for future queries, and the like. In an embodiment, search engine 212 communicates a message to user device 210 if the submitted query does not yield any results. The message informs user device 210 that the submitted query did not yield any results.

In an embodiment, upon identifying search results that satisfy the search query, search engine 212 returns a set of search results to user device 210 by way of a graphical interface such as a search results page. A set of search results includes representations of content or content sites (e.g., webpages, databases, or the like that contain content) that are deemed to be relevant to the user-defined search query. Search results can be presented, for example, as content links, snippets, thumbnails, summaries, and the like. Content links refer to selectable representations of content or content sites that correspond to an address for the associated content. For example, a content link can be a selectable representation corresponding to a uniform resource locator (URL), IP address, or other type of address. That way, selection of a content link can result in redirection of the user's browser to the corresponding address, whereby the user can access the associated content. One commonly used example of a content link is a hyperlink.

As shown in FIG. 2, search engine 212 includes storage 214 for storing content, search indexes, or the like. It should be understood by those of ordinary skill in the art that storage 214 is scalable, and that there may actually be a number of storage modules associated with search engine 212. Storage 214 can reside on the same machine as search engine 212. In another embodiment, storage 214 is remote from search engine 212, and in either case, search engine 212 communicates with storage 214 to perform searches and retrieve content, index items, and the like, which are stored on storage 214.

With further reference to FIG. 2, exemplary networking environment 200 also includes history 218. History 218 can be, or include, a storage module (e.g., a database, index, table, or other storage), a history manager, and the like. History 218 maintains history information 220 associated with user search behavior. As used herein, history information 220 refers to information that reflects the activity of a user with respect to the search engine 212, and can include data representations of search queries issued by the user, search results provided to the user in response to search queries, selection indications that indicate that the user has selected a search result or other content link, dwell time (indicating the amount of time a user spends at a particular content site prior to returning to the search engine or viewing a search results page), and any other type of activity that can be monitored and recorded by tracking a user's inputs. Data representations, as referred to throughout the present disclosure, mean information that can be stored and accessed, and can take the form of any number of different types of formats. In embodiments of the present disclosure, each instance of history information 220 collected and recorded is time-stamped.

As explained above, sometimes a user that submits a search query is attempting to engage in a comparison task. Comparison service 216 operates in connection with search engine 212 to provide a more relevant experience to the user when the user is engaging in a comparison task. As illustrated in FIG. 2, comparison service 216 includes an entity extraction component 226, an entity classification component 228, an inference component 230, a comparison experience component 232, and a learning component 234. In various embodiments of the invention, comparison service 216 can include additional components and in some embodiments, one or more of the components 226, 228, 230, 232, and 234 may be integrated or combined to form a smaller number of distinct components. In other embodiments, comparison service 216, or any of the components 226, 228, 230, 232, and 234 included therein, may be integrated with search engine 212, and in further embodiments, comparison service 216, or any of the components 226, 228, 230, 232, and 234 included therein, may be separate from search engine 212.

Entity extraction component 226 extracts entities from search queries. Entities can include letters, characters, words, phrases, and the like. In embodiments, an entity is something that can be compared to another entity. That is, for example, an entity may be a product, a service, a person, a place, an activity, or the like. After extracting an entity from a search query, entity extraction component 226 provides entity extraction information regarding the entity and its extraction to history 218. Additionally, entity extraction component 226 provides the extracted entity to entity classification component 228.

Entity classification component 228 associates extracted entities with entity classes. In embodiments, entity classes can include any type of classification scheme that is useful for identifying comparisons between entities. Additionally, an entity may be associated with any number of entity classes. As an example, entity extraction component 226 may extract the following entity from a search query: "Windows." Entity classification component 228 can associate the entity with a number of various types of entity classes. For example, the entity "Windows" may have a number of different meanings depending on the context in which the entity is extracted. That is, "Windows" may refer to the familiar glass objects that are inserted within walls, thereby providing views beyond the walls, graphical user interface objects that are commonly displayed and manipulated on a computer screen, a type of operating system, a registered trademark, or even a metaphorical construct (e.g., "windows into the soul"). Accordingly, in embodiments, entity classification component 228 can take into account additional information when associating the entity with a particular entity class, at least for the purposes of a particular query.

For example, in embodiments, the associations may be made based on information about the user, the search query, other entities appearing in the search query, history information associated with the user, the appearance of the entity in the search query (e.g., whether certain letters are capitalized, etc.), or any other information that can assist in the classification of the entity. For example, suppose that the user had previously submitted queries related to computers and software. In that case, entity classification component 228 may associate "Windows" with entity classes that include graphical user interface objects as well as entity classes that include operating systems and other attributes associated with operating systems. For example, entity classification component 228 may associate the entity "Windows" with one entity class that includes all of the products available from Microsoft® Corporation of Redmond, Wash., another entity class that includes all of the operating systems available from the various companies that provide operating systems (e.g., Microsoft®, Apple®, etc.), and another entity class that includes the various versions of Windows® operating system software available from Microsoft® Corporation of Redmond, Wash. Additionally, entity classification component 228 may detect that the first letter (i.e., the "W") is capitalized and process that information as an indication that the user is seeking information regarding, for example, either the operating system available from Microsoft® Corporation or the trademark registered to Microsoft® Corporation. Of course, entity extraction component 228 could associate the entity with any number of other entity classes as well.

Entities and their associations can be maintained in an entity dictionary 231, which can be a storage module associated with comparison service 216, as illustrated in FIG. 2. Each entity in entity dictionary 231 is identified using a unique identifier. Entity dictionary 231 can be, or include, any type of database, table, or other storage technology suitable for storing data representations of entities and their associations. For example, in an embodiment, entity dictionary 231 can be a relational database or a set of inter-related databases. Additionally, entity dictionary 231 can be associated with a dictionary manager 235 that provides any number of various functions related to entity dictionary 231. For example, in some embodiments, dictionary manager 235 provides interfaces between entity dictionary 231 and other components 226, 228, 230, 232 in comparison service 216. In embodiments, dictionary manager 235 manages the information contained in entity dictionary 231 and in some embodiments, dictionary 235 populates entity dictionary 231 with information such as, for example, comparison information 233.

Comparison information 233 can include any type of information associated with an entity that can be compared to similar information associated with another entity or entities. As it relates to an entity, an item of comparison information 233 can be referred to as an attribute. That is, entities in entity dictionary 231 can include attributes associated therewith. In some embodiments, dictionary manager 235 references one or more information sources 222, 224 to retrieve attributes associated with entities listed in entity dictionary 231. According to various embodiments, dictionary manager 235 retrieves the attributes during an entity-dictionary building process that may happen at any time, including before receipt of a user query. In other embodiments, dictionary manager 235 retrieves attributes contemporaneously with preparing a response to a specific search query. Dictionary manager 235 associates the attributes with the entities and maintains those associations in entity dictionary 231.

In embodiments, comparison information 233 can include objective comparison information and subjective comparison information. Objective comparison information includes attributes that are objective in nature. For example, objective comparison information can include physically descriptive attributes, attributes related to objectively-observable performance measures, prices, and the like. Objective comparison information can, in many instances, be directly compared between two or more entities of the same entity class. In contrast, subjective comparison information includes attributes that are subjective in nature, and can be thought of as being indirectly comparable across two or more similar entities. For example, in embodiments, subjective attributes (e.g., comparison information) can include user reviews, ratings, and the like. In some embodiments, dictionary manager 235, or some other component of comparison service 216, references information sources 222, 224 to retrieve subjective attributes corresponding to an entity. These subjective attributes can then be interpreted, aggregated, analyzed, and associated with corresponding entities in entity dictionary 231.

For example, in an embodiment, dictionary manager 235 may reference a number of information sources 222, 224 to obtain user reviews of a particular product. The content of the user reviews can be stored in entity dictionary 231 and associated with the corresponding entity (i.e., product). Additionally, dictionary manager 235 can aggregate ratings associated with the user reviews to provide overall ratings of the entity. In some embodiments, dictionary manager 235 may also interpret the text of the user reviews to extract repeated comments, noteworthy qualities, and the like. In an embodiment, dictionary manager 235 can assess whether a given review is positive or negative in nature and in other embodiments, dictionary manager 235 can aggregate items from reviews that are positive and items that are negative. Information from subjective attributes such as, for example, user reviews can be aggregated over a corresponding entity, or any other related attributes, and maintained in entity dictionary 231 with an association defined between the aggregated information and the corresponding entity.

With continued reference to FIG. 2, upon extracting and classifying an entity from a search query, an inference component 230 is invoked. Inference component 230 calculates a likelihood that the user is engaging in a comparison task. According to embodiments of the present invention, there are at least two different types of inferences that can be made regarding whether a user likely is engaging in a comparison task: an explicit inference and an implicit inference.

In the case of an explicit inference, inference component 230 determines that the search query includes an explicit comparison call. In an embodiment, an explicit comparison call includes a keyword (which may be a letter, a character, a phrase, or the like) that indicates that the user is searching for comparison information associated with a first entity and at least a second entity that is different than the first entity. For example, an explicit comparison call can include two or more entities connected by a comparison term. Examples of comparison terms include, but are not limited to, keywords such as "vs.", "v" "versus", "compared to", "compared with", "compare", and the like.

In other embodiments, an explicit comparison call can be a set of entities that may, or may not, include a comparison term. For example, an explicit comparison call may appear as a list of entities that are all associated with at least one common class. To illustrate, the following may be an explicit comparison call for a comparison experience related to various types of apples: "jonagold, red delicious, golden delicious, honey crisp." Thus, in various embodiments, when inference component 230 determines that one of these comparison calls is included in a user's search query, either by examining the query directly or by reviewing the entities extracted by entity extraction component 226, inference component 230 determines that the user likely is engaging in a comparison task and invokes comparison experience component 232 to provide a comparison experience of the entities identified by the user.

Inference component 230 also can perform an implicit analysis to determine whether a user likely is engaging in a comparison task. The implicit analysis may be invoked, according to embodiments, based on a failure to identify an explicit comparison call in a search query. Inference component 230 can use the text of the query, context associated with the query, user behavior, history information 220, entity extraction information provided by entity extraction component 226, and any other type of information to infer whether the user likely is engaging in a comparison task. Any number of algorithms can be used to draw the inference that a user likely is engaging in a comparison task.

In an embodiment, inference component 230 calculates a confidence interval that represents a likelihood that the user is engaging in a comparison task. According to embodiments of the invention, the confidence interval can be calculated based on a number of times that entities associated with one or more particular entity classes have been extracted from search queries received from the user (or by a number of users) during a predetermined period of time, the degree of similarity between two or more entities extracted from a search query, an amount of time between extractions of such entities, and any other history information 220 that may be useful in estimating a likelihood that the user is engaging in a comparison task. In embodiments, for example, inference component 230 may reference history information 220 that includes data about previous search queries received from the user during the same search session or over a number of search sessions.

For example, in one embodiment, inference component 230 can be configured to reference entities extracted over a certain period of time to determine whether any of the entities belong to at least one common class. Entities that belong to a common class may be the subject of an attempted comparison task. In some embodiments, additional characteristics (i.e., attributes) associated with each of two or more entities are examined to determine how similar the extracted entities are. For instance, if three entities are extracted over a predetermined period of time each belong to a class defined by automobiles, attributes associated with each of the three particular entities can be examined to determine if the user likely is attempting to compare the three automobiles. In this example, inference component 230 may calculate a confidence interval that represents a high likelihood that the user is engaging in a comparison task if the analysis reveals that each of the three entities have four doors (e.g., each entity belongs to a class defined by four-door automobiles), similar engine sizes, and the like. In embodiments, any number of various attributes can be analyzed in the calculation of the confidence interval, and, thus, the determination of a likelihood that the user is engaging in a comparison task between two or more entities.

In some embodiments, inference component 230 can use classifiers in estimating a likelihood that a user is engaging in a comparison activity. A classifier is a function, $f(x)$, that maps an input attribute vector, $x=(x1, x2, x3, \ldots, xn)$, to a confidence that the input belongs to a class and can be represented, for example, as $f(x)=\text{confidence}(x \in \text{class})$. Such classification can employ a statistical analysis to infer whether a user likely is engaging in a comparison task. For example, in embodiments, input attributes can include characters, words, or phrases or other data specific attributes derived from the characters, words, or phrases. In embodiments of the invention, the characters, words, and/or phrases are entities extracted from a user search query. The classes, which may be referred to as comparison classes, relate to whether or not the user's activity is a comparison task.

Examples of classifiers that could be employed in embodiments of the invention include support vector machines (SVMs), Bayesian classifiers, decision trees, neural networks, fuzzy logic models, statistical regression and the like. Classifiers can be explicitly trained (e.g., through generic training data) as well as implicitly trained (e.g., by observing and analyzing user behavior with respect to comparison activities, incorporating extrinsic information such as information developed through research studies, etc.).

When a user begins searching for content using search service 212, a search session is instantiated. As used herein, a search session refers to a variable length of time during which a user is utilizing search engine 212 to search for content (e.g., entities). In an embodiment, each session can be identified by a unique search session identifier (USSID). Throughout the course of a search session, the associated USSID is used for various purposes, including, for example, to keep track of history information collected during the session. That is to say that, when history information is collected and recorded, it is associated with the USSID corresponding to the search session to which the history information pertains.

As mentioned above, a search session refers to a variable length of time. The length of time of a search session is configurable, and can be either predetermined, dynamically determined, or determined according to occurrence of particular events. For example, in an embodiment, a search session can be defined by a predetermined amount of time, for example an hour. In this case, the predetermined amount of time can be thought of as a cap, or an upper bound, on the amount of time during which a particular USSID will be associated with a user's search history. Thus, if a user actively searches for content using search engine 212 for twenty minutes and then navigates away from search engine 212, the search session can be terminated, as it does not make sense to allow a session to continue to run in the absence of user activity. It should be understood that various types of thresholds and rules can be established for determining when a search session should be terminated, so as to allow for instances where a user may temporarily engage in an unrelated task, and return to the search session. For example, in some embodiments, a search session can be defined by a period of searching activity that is followed by a predetermined amount (e.g., 30 minutes) of inactivity or activity not related to the search activity.

In other embodiments, the time period constituting a search session can be dynamically determined. For example, search engine 212 may present an option to the user that allows the user to manually configure the time for each search session. In further embodiments, the time period corresponding to a search session may be determined based on the level of user activity, the nature of user activity, or the like. In some cases, search session time periods can be configured based on bandwidth requirements, business rules, or other various types of considerations. In still further embodiments of the present disclosure, the length of a search session can be determined by the occurrence of certain events. For example, a search session can be instantiated upon the occurrence of an event such as the user first navigating to search engine 212, the user changing states from unauthenticated to authenticated by signing in, and the like.

Upon calculating a confidence interval, inference component 230, according to some embodiments, compares the confidence interval to a threshold or thresholds, which can be intervals or values, to determine how likely it is that the user is engaging in a comparison task. For example, in various embodiments, if the confidence interval includes a certain number of values greater than a certain number of values in a threshold interval (or greater than the threshold value), either of which may be referred to herein as being "greater than" the threshold," the inference component 230 may infer a greater likelihood that the user is engaging in a comparison task than if the confidence interval includes smaller values. The degree of likelihood can be used to determine the nature of access to a comparison experience that is ultimately provided to the user. That is, for example, if inference component 230 determines that it is very likely that a user is engaging in a comparison task (e.g., by determining that the confidence interval is "greater than" a first threshold), comparison service 216 can provide a comparison experience to the user without the user's explicit request of a comparison experience. If, for example, inference component 230 determines that it is somewhat less likely, but still likely, that the user is engaging in a comparison task (e.g., by determining that the confidence interval is "greater than" a second threshold, but less than the first threshold), the user can be provided with a non-intrusive hook in the search experience that includes a selectable option for invoking a comparison experience if the user so chooses. If, however, inference component 230 determines that it is unlikely that the user is engaging in a comparison task (e.g., by determining that the confidence interval is "less than" the second threshold), the user can be provided with a search results page that does not include access to a specific comparison experience.

When inference component 230 determines that there is some likelihood that a user is engaging in a comparison task, comparison experience component 232 is invoked. Comparison experience component 232 generates a comparison experience and provides the user access to the comparison experience. In embodiments of the invention, a comparison experience can include any type of experience that can be provided to the user to enable the user to compare attributes (e.g., comparison information) associated with two or more entities. For example, in one embodiment, a comparison experience includes a side-by-side display of comparison information associated with a number of entities. According to various embodiments of the invention, a side-by-side display of comparison information can refer to any visual arrangement of comparison information associated with two or more entities. For example, in embodiments, the side-by-side display may be arranged horizontally, in which the attributes corresponding to each entity are grouped into columns. In other embodiments, the side-by-side display may be arranged vertically, in which the attributes corresponding to each entity are grouped into rows. And in still further embodiments, the side-by-side display can be arranged in any other manner that allows comparison of the attributes of the various entities. In other embodiments, a comparison experience can include tables, charts, graphs, and/or other types of illustrations and mechanisms for indicating comparison information associated with a number of entities. A comparison experience can include objective comparison information, subjective comparison information, or both.

Comparison experience component 232 references comparison information to generate the comparison experience. In embodiments, comparison experience component 232 references information sources 222, 224 to obtain comparison information for use in a comparison experience. In other embodiments, comparison experience component 232 references entity dictionary 231 to retrieve comparison information. In further embodiments, comparison experience component 232 can reference both information sources 222, 224 and entity dictionary 231 to retrieve comparison information. In embodiments, comparison experience component 232 interfaces with user device 210 to render the comparison experience on user device 210, and in other embodiments, comparison experience component 232 interfaces with search engine 212 to provide the comparison experience to user device 210. In some embodiments, comparison experience component 232 can also reference user preferences to configure the comparison experience for the user. User preferences can be maintained by comparison service 216, history 218, search engine 212, or any other component. Comparison experience component 232 may also provide a user interface so that a user can configure a comparison experience.

With continued reference to FIG. 2, comparison service 216 includes a learning component 234. Learning component 234 can provide any number of functions. For instance, in some embodiments, learning component 234 analyzes historical behavior associated with a user to enable inference component 230 and/or comparison experience component 232 to provide more useful and relevant services to the user. In an embodiment, learning component 234 analyzes historical behavior associated with a user to enable inference component 230 to calculate more useful confidence intervals in response to subsequent search queries received from the user. In other embodiments, learning component 234 analyzes historical behavior associated with a number of users and provides the results of the analysis to inference component 230 for use in calculating a likelihood that particular query patterns indicate a likelihood that a user is engaging in a comparison task. Moreover, learning component 234 can be utilized to enhance and refine any of the processes and functions associated with comparison service 216. Learning component 234 can implement any number of machine-learning techniques to facilitate enhancement of the processes performed by comparison service 216 including, for example, artificial intelligence, rules-based logic, modeling, graphs, neural networks, and the like.

Figure 3:
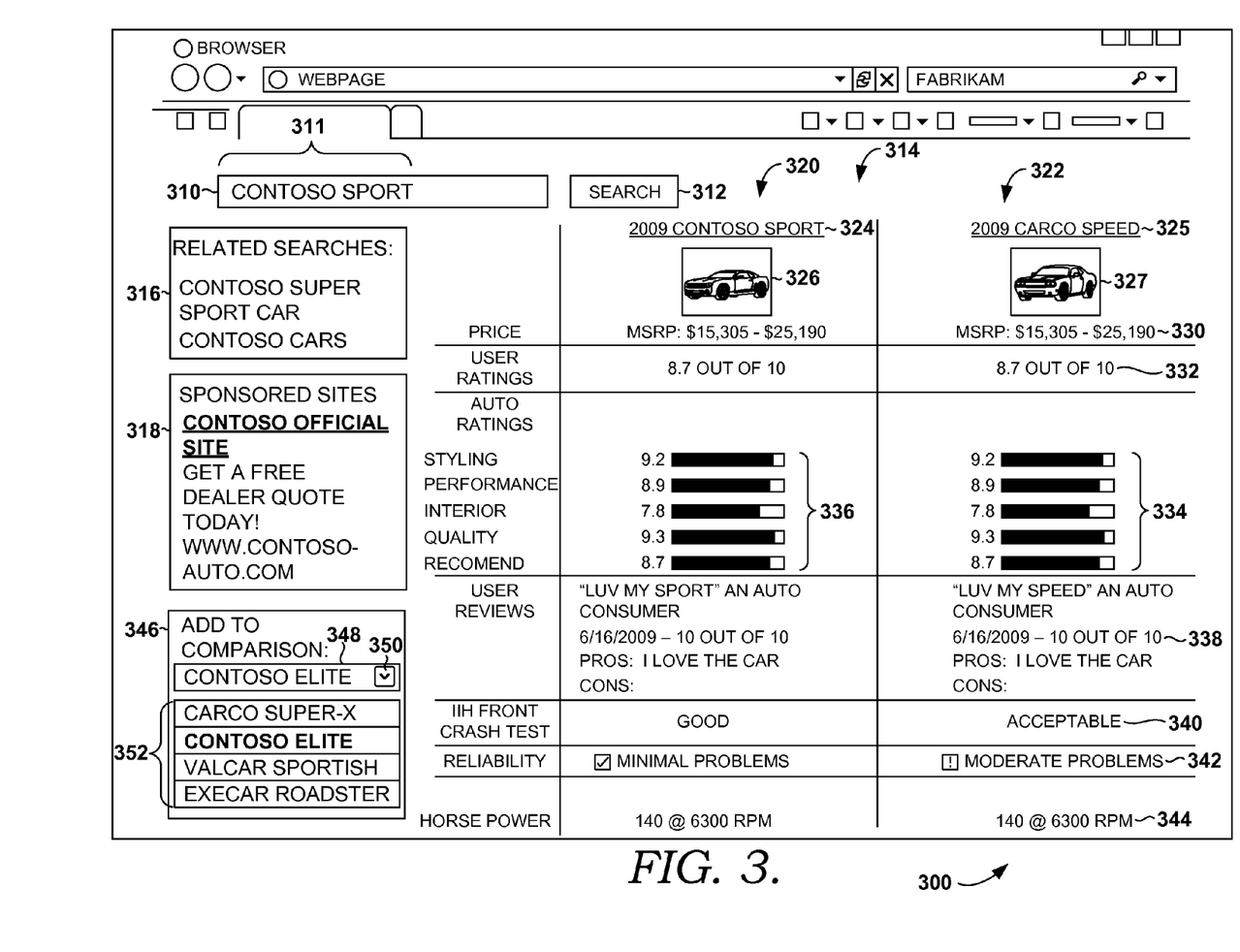
FIG. 3 depicts an illustrative display of a graphical user interface providing a comparison experience in accordance with embodiments of the invention.

Turning now to FIG. 3, an exemplary comparison experience 300 is depicted in accordance with an embodiment of the present invention. As illustrated in FIG. 3, comparison experience 300 is presented to a user on a graphical user interface, which may be a component of a webpage displayed in a browser window, an application interface, or the like. Additionally, nothing in the depiction and description of the exemplary comparison experience 300 depicted in FIG. 3 is intended to limit the configuration of comparison experiences as described herein. Any number of formats, organizations, information selections, and the like may be employed when providing a comparison experience. Additionally, in some embodiments, users may be able to configure comparison experiences so that they are personalized to the particular user.

In one embodiment, as illustrated in FIG. 3, exemplary comparison experience 300 is displayed in response to either a user selection of an option to invoke the comparison experience 300 or in response to an inference that the user is explicitly searching for a comparison experience 300. Comparison experience 300 includes a search query text input box 310 for receiving a user search query 311. A search button 312 is included, although in embodiments, a search can be instantiated by striking an enter key or the like.

Comparison experience 300 includes a side-by-side display 314 of comparison information associated with two entities: a 2009 Contoso Sport 320 and a 2009 Carco Speed 322, two automobiles that are associated with a similar entity class. Note that the user's search query was "Contoso Sport," which may belong to a class including Contoso Sports of all years, another class including automobiles manufactured by Contoso, another class including all two-door coupes, and any number of other classes. Exemplary comparison experience 300 also includes information commonly found on search results pages such as a related searches section 316 and a sponsored sites section 318. Any number of other types of information may be included in a comparison experience display as well. It should be understood that, in the exemplary comparison experience 300, a determination has been made that the 2009 Contoso Sport 320 and 2009 Carco Speed 322 are both associated with at least one similar class (e.g., "two-door coupes"). Additionally, unless the user had specifically provided input to request the comparison experience 300 directly, there may also have been a determination made that the user likely was interested in comparing the 2009 Contoso Sport 320 and 2009 Carco Speed 322.

The side-by-side display 314, which is arranged horizontally in FIG. 3, of comparison information includes objective attributes and subjective attributes. As indicated above, the side-by-side display 314 can alternatively be arranged vertically or according to any other arrangement that permits comparison of the various attributes. The objective attributes include: entity names (identifications) 324, 325; prices 330; crash test results 340 (which may be represented as numerical data or a more subjective-appearing textual description); and horsepower 344. The subjective attributes include: auto ratings 334, 336; user reviews 338; and reports of reliability 342. Accordingly, exemplary comparison experience 300 includes textual information 324, 330, 332, 338, 340, 342, and 344, as well as graphical information 326, 327, 334, and 336. In embodiments, the types of information selected for display in a comparison experience can be based on any number of factors such as, for example, inputted user preferences, device limitations associated with the user's device, network communication limitations, learned (inferred) user preferences, and the like.

It will be readily appreciated that any of these attributes or other attributes such as, for example, pictures 326, 327, may be argued to be objective or subjective based on any number of factors. For example, a photograph of a product may be said to be objective because it is a concrete manifestation of the appearance of the product. On the other, hand, a photograph of a product may be said to be subjective, or include subjective aspects, because it is the product of artistic decisions made by the photographer that took the photograph. Such distinctions are not, by themselves, germane to this disclosure. What is important to note is that comparison information can include objective and/or subjective attributes, however one is to define the respective categories.

According to embodiments of the invention, the user can be provided with options for determining how and when comparison information will be presented. Options can be provided for configuring the size, shape, appearance, and functionality of the comparison experience 300. In some embodiments, options can be provided for removing comparison information from the experience 300, for adding information to the experience 300, for setting preferences, and the like. In embodiments, the user may be able to configure the type of information displayed on a search results page or in the comparison experience 300. For example, in one embodiment, the user can optionally configure the rules by which entities are selected to be presented in a comparison experience. According to embodiments of the present invention, any number of the features and functionalities discussed herein can be configurable by the user via some form of a management component.

With continued reference to FIG. 3, options 346 for adding entities to (or subtracting entities from) the comparison experience 300 are presented to the user. Although the exemplary options 346 illustrated in FIG. 3 are depicted as being provided in the context of a drop-down box 348 having a selectable button 350 for displaying a number of suggested entities 352 for adding to the comparison experience 300, it is contemplated that similar options can be provided to the user in any sufficient format. For example, such options 346 can be provided in the form of selectable buttons, links, text boxes, pop-ups, or any other visually accessible format. In embodiments, the suggested entities 352 can be ascertained by referencing an entity dictionary such as, for example, the entity dictionary 231 described above with reference to FIG. 2. The entity dictionary can be referenced to identify additional entities that share one or more common classes or attributes with the entities 320 and 322 that are already displayed as part of the comparison experience 300.

In embodiments, the suggested entities 352 can be identified based on an analysis of comparison tasks and search behavior associated with additional users, as well as on aggregations of data regarding search and comparison activity associated with a large number of users. Similarly, in some embodiments, the suggested entities 352 can be identified by referencing the particular user's history. In still further embodiments, the suggested entities 352 can be placed in connection with an advertising campaign, instant answer service, or any other type of service, advertising arrangement, and the like.

Figure 4:
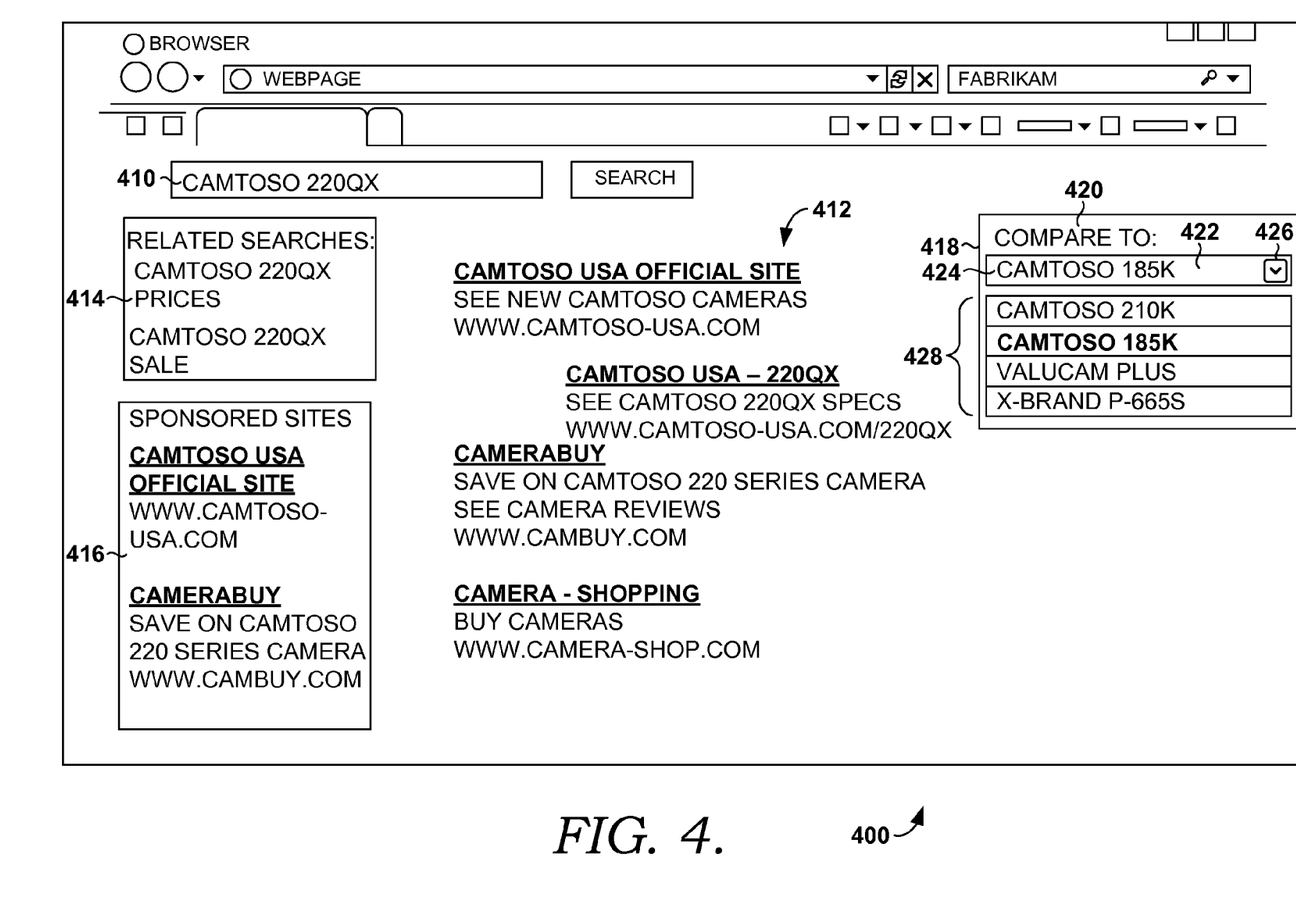
FIG. 4 is an illustrative display of a graphical user interface providing a search results page with a hook into a comparison experience in accordance with embodiments of the invention.

An alternative embodiment of the present invention is depicted in FIG. 4, which shows an illustrative search results page 400 in which access to a comparison experience is provided in accordance with embodiments of the present invention. Incident to a user submitting a search query 410, a set of search results 412 is displayed to the user. Illustrative search results page 400 also includes information commonly found on search results pages such as a related searches section 414 and a sponsored sites section 416. Any number of other types of information may be included in a comparison experience display as well.

With continued reference to FIG. 3, a non-intrusive hook into a comparison experience is displayed as a selection box 418. Selection box 418 includes a title 420 identifying the selection box 418 as one linked to a comparison experience, an input box (which, in some embodiments may be a selection display box) 422, and a button 426 for displaying alternative entities 428 that may be selected between for comparison to the entity extracted from the user's query 410. In the illustrated embodiment, the input/selection display box 422 displays a currently selected entity 424 for comparison. Selection of an entity from the selection box 418 causes a comparison experience to be invoked, which is subsequently presented to the user. As described above, a selection box 418 or other non-intrusive hook into a comparison experience can be displayed to the user in response to receiving a search query so as not to burden the user with information for which the user was not searching, while providing access to a comparison experience that the user can invoke if desired.

Figure 5:
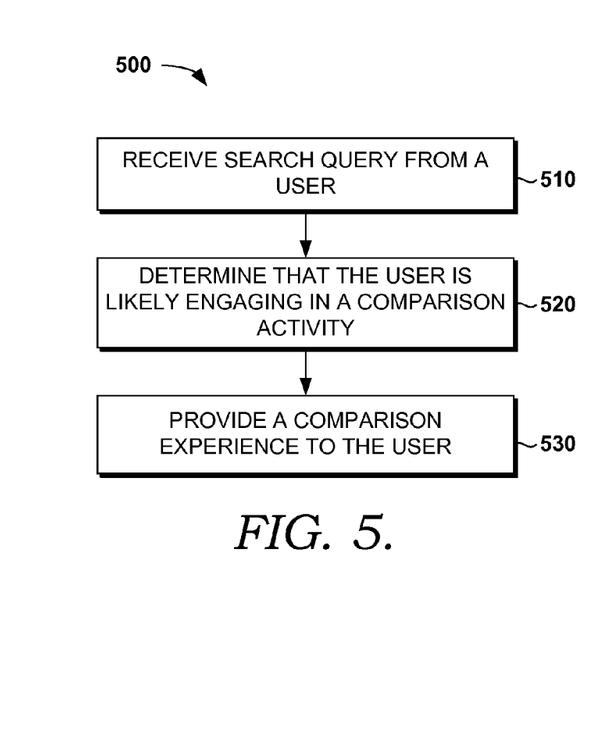
FIG. 5 is a flow diagram illustrating an exemplary method of providing a comparison experience in response to a search query in accordance with embodiments of the invention.

To recapitulate, the disclosure above has described systems, machines, media, methods, techniques, processes and options for providing a comparison experience in response to a search query. Turning to FIG. 5, a flow diagram is illustrated that shows an exemplary method 500 for providing a comparison experience in response to a search query according to embodiments of the present invention. In some embodiments, aspects of embodiments of the illustrative method 500 can be stored on computer-readable media as computer-executable instructions, which are executed by a processor in a computing device, thereby causing the computing device to implement aspects of the method 500. The same is, of course true, with the illustrative methods depicted in FIGS. 5, 6, 7, and 8, or any other embodiment of these methods. The computing device can be associated with, for example, a comparison service, search service, and the like.

At step 510, a search query is received from a user. The search query may include any number of characters, words, and phrases. Additionally, the search query may be submitted by a user by way of an input device connected to the user's computing device. Exemplary input devices include, but are not limited to, a keyboard, a mouse, a microphone, a digital pen, a touch-screen, and a stylus. The search query includes at least one entity (e.g., a first entity).

At step 520, a determination is made that the user is likely engaging in a comparison task. An inference module running on a computing device or system associated with a search service can utilize any number of types of information to make this determination. In embodiments of the invention, the inference determines that the search query includes an explicit comparison call. The explicit comparison call can be, for example, a keyword that indicates that the user is searching for comparison information associated with the first entity and a second entity that is included in the search query. In some embodiments, determining that the user likely is engaging in a comparison task further includes associating the first entity with a first entity class and referencing an entity dictionary to identify that the entity dictionary includes a third entity, which is different than the first entity and, which is associated with the first entity class. The inference component further can determine that the third entity had been extracted from a previous search query submitted by the user.

According to various embodiments of the invention, determining that the user likely is engaging in a comparison task includes calculating a confidence interval that represents a likelihood that the user is engaging in a comparison task. In embodiments, the confidence interval is based on a number of times that entities associated with the first entity class have been extracted from search queries previously submitted by the user. In other embodiments, the confidence interval is based on an amount of time between extraction of the third entity from the previous query submitted by the user and extraction of the first entity from the search query submitted by the user. In still further embodiments, the confidence interval may be based on both the number of times and the time between extractions. Any number of other methods of calculating the confidence interval may be employed as well such as, for example, by employing classifiers.

At a final illustrative step 530, a comparison experience is provided to the user. As described above, the comparison experience can include, in some embodiments, a side-by-side display of comparison information associated with the first entity and another entity that is different from the first entity. In other embodiments, the comparison experience can include tables, charts, graphs, and the like and can be customizable by users, the search service, devices, and the like.

Figure 6:
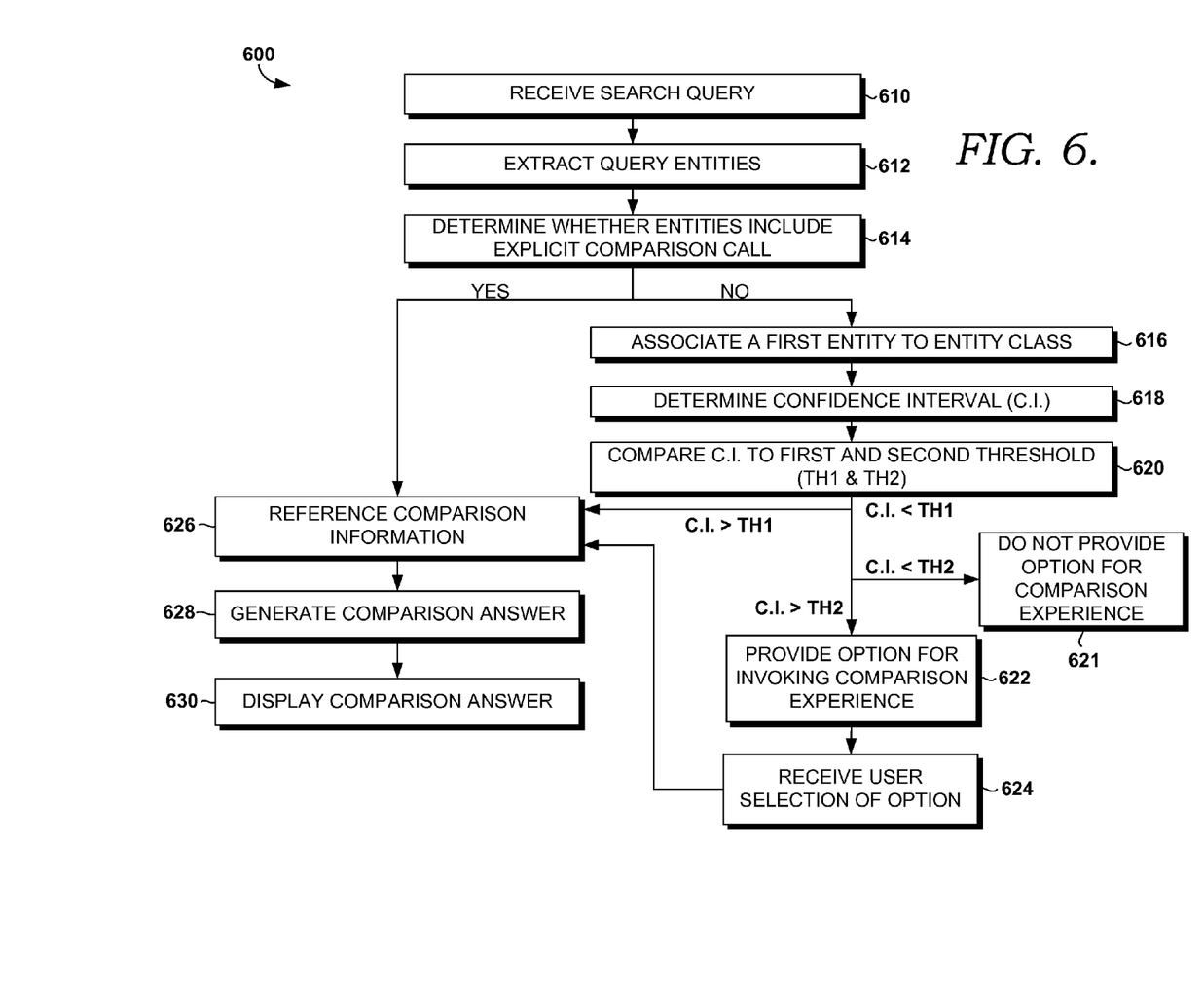
FIG. 6 is a flow diagram illustrating an exemplary method of providing a comparison experience in response to a search query in accordance with embodiments of the invention.

Turning now to FIG. 6, another illustrative method 600 of providing a comparison experience is illustrated as a flow diagram. Embodiments of the illustrative method 600 include receiving a search query, as illustrated at step 610. At step 612, entities are extracted from the search query. At step 614, a determination is made whether the extracted entities (and thus, the search query) include an explicit comparison call. If the search query does include an explicit comparison call, a comparison experience, as described below with reference to steps 626, 628, and 630, is invoked. If not, an implicit analysis is performed. A first entity is associated to an entity class, as shown at step 616.

At step 618 a confidence interval representing a likelihood that the user is engaging in a comparison task is calculated. According to embodiments of the invention, the confidence interval is calculated based on a history of the user's search activities pertaining to the first entity. In embodiments, the history of the user's search activities pertaining to the first entity includes data indicating a number of times that the first entity was extracted from a search query submitted by the user and an amount of time that has passed between extraction of the first entity from the first search query and receiving the second search query from the user.

At step 620, the confidence interval (labeled "C.I." in FIG. 6) is compared to a first predetermined threshold (labeled "TH1" in FIG. 6) and a second predetermined threshold (labeled "TH2" in FIG. 6). The first and second predetermined thresholds could be values, sets of values, intervals, or even sets of intervals. When comparing the confidence interval to a threshold, in various embodiments, the comparison can be between the entire interval and the threshold or between one or more values in the interval and the threshold. Thus, although FIG. 6 indicates that the confidence interval will be either less than or greater than a threshold, this really could mean, for example, that one value of the confidence interval is greater than or less than the threshold (or greater than a particular value of the threshold) or any other conclusion that can be drawn by comparing some aspect of the confidence interval with some aspect of the threshold.

Accordingly, if C.I.<TH1, the inference is that, although the user may be engaging in a comparison task, the likelihood that the user is doing so is not great enough to justify interrupting the user's search experience by providing the comparison experience to the user without receiving input from the user. If C.I.>TH2, the likelihood that the user is engaging in a comparison task is very low, and no comparison experience, or access thereto, is provided, as shown in step 621. However, if C.I.>TH2, the method proceeds with step 622, at which an option for invoking a comparison experience is provided to the user. Upon receiving selection of the option to invoke the comparison experience, as shown at step 624, the comparison experience is invoked. In contrast, if C.I.>TH1, the inference is that the user likely is engaging in a comparison task and the likelihood that the user is doing so is great enough to justify providing the comparison experience to the user without first requiring input from the user.

Invocation of the comparison experience includes referencing comparison information, as shown at step 626. At step 628, a comparison experience is generated and, at a final illustrative step, step 630, the comparison experience is provided.

Figure 7:
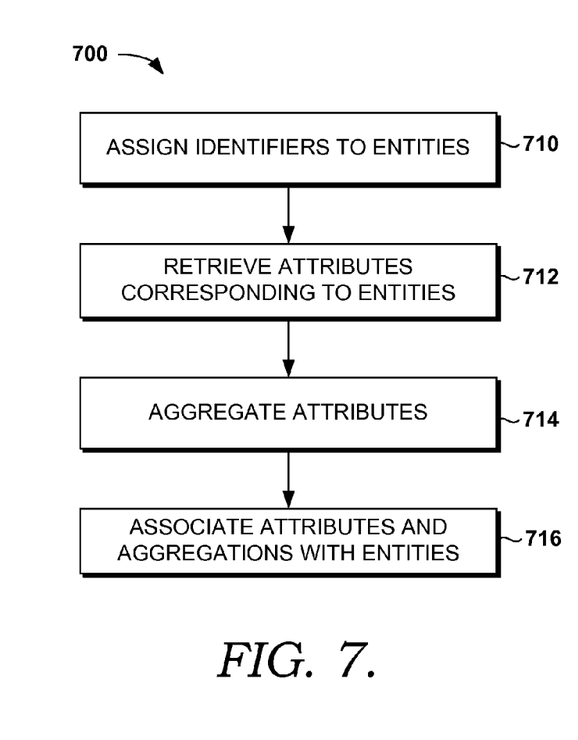
FIG. 7 is a flow diagram illustrating an exemplary method of constructing an entity dictionary in accordance with embodiments of the invention.

Turning now to FIG. 7, an illustrative method 700 of constructing an entity dictionary in accordance with embodiments of the invention is depicted as a flow diagram. At a first step 710, identifiers are assigned to entities as entities are entered into the dictionary. Thus, after step 710, there will be at least a set of representations of entities and a set of associated identifiers. In embodiments, each entity is associated with a unique identifier. In some embodiments, more than one entity may be associated with a single unique identifier and in other embodiments, an entity may be associated with more than one identifier. The particular implementation will depend upon how the dictionary is structured, how the dictionary is queried, existing data management systems at an implementation site, and the like.

As shown at step 712, attributes corresponding to each entity are retrieved. In embodiments, a dictionary manager component, web indexing component, or some other component can reference information sources to retrieve data, text, graphics, and other types of information that include attributes about an entity. As described above, attributes can be subjective and/or objective.

At step 714, at least some of the attributes are aggregated. Where entities include values, ratings, or some other measurement, the attributes can be aggregated across each corresponding entity. Attributes can also be aggregated over other variables such as user, geographical region, date, time, type of attribute, and the like. It will be readily appreciated that many objective attributes can be aggregated using standard methods of data management. Additionally, subjective attributes can be aggregated, as described above. For example, user reviews can be parsed and analyzed to extract qualitative data that can be aggregated.

At a final illustrative step, step 716, the attributes and the aggregated attributes are associated with the corresponding entities. In embodiments, only the attributes can be associated with the entities. In that case, embodiments of the invention contemplate including attribute aggregation processing at a later time, such as during processing of a relevant search query. In that manner, attributes could be aggregated across variables that are particularly relevant to the user, the search query, the context of the search query, and the like. In other embodiments, only the aggregated attributes are associated with the entities. Implementations such as this may be desired, for example, when data storage resources are limited or where it is prudent to distribute processing loads over a greater time.

Figure 8:
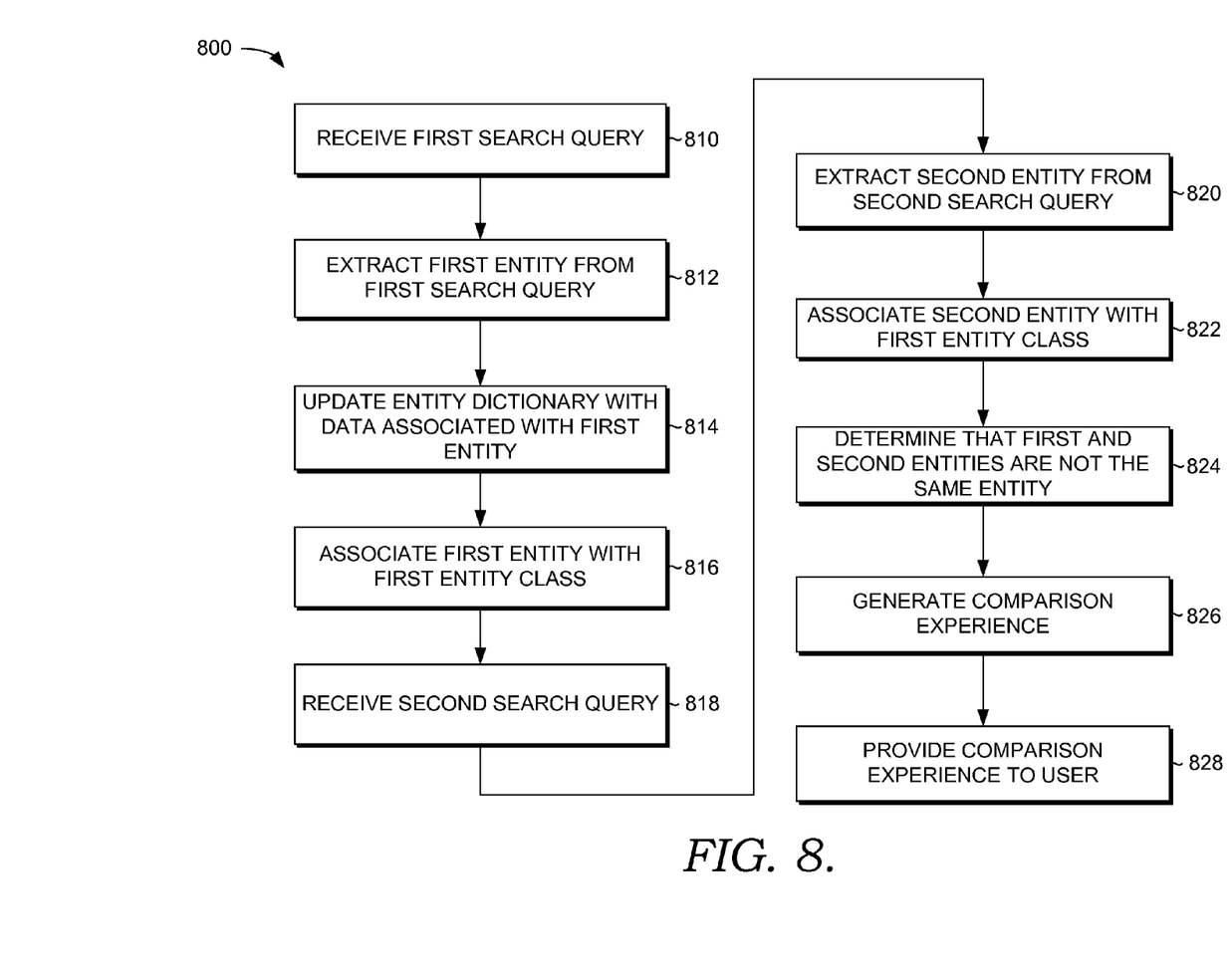
FIG. 8 is another flow diagram illustrating an exemplary method of providing a comparison experience in response to a search query in accordance with embodiments of the invention.

Turning to FIG. 8, a final illustrative method 800 of providing a comparison experience is depicted. At an initial step 810, a first search query is received from a user. At step 812, a first entity is extracted from the search query and, as shown at step 814, an entity dictionary is updated with data associated with the first entity. In embodiments, the data regarding the first entity includes an indication of when the first search query containing the first query was received, an identification of the user, contextual information about the search query, an identification of the search session during which the query was received, and any other history information that may be useful to the search engine or a comparison service. At step 816, the first entity is associated with a first entity class. In embodiments, the first entity may also be associated with a number of additional entity classes. Of course, the search query may contain additional entities as well. In that case, each entity in the search query can be extracted and associated to one or more classes.

At some time after receipt of the first search query, a second search query is received from the user, as shown at step 818. At step 820, a second entity is extracted from the second search query and, as shown at step 822, the second entity is associated with the first entity class. A determination may also be made, according to some embodiments, that the first entity was previously extracted from the first search query submitted by the user. Recurrence of the same entity or entities of the same class across multiple queries may imply that the user is engaging in a comparison task.

At step 824, a determination is made that the first entity and the second entity are not the same entity. In embodiments, if the first entity and the second entity are the same entity, an entity dictionary may be updated with information about the extraction of the second entity, but of course, invoking a comparison between the two identical entities would be of limited use. At step 826, a comparison experience is generated and at a final illustrative step 828, the comparison experience is provided to the user.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and sub-combinations. This is contemplated by and is within the scope of the claims.

The invention claimed is:

1. One or more memory devices storing computer-executable instructions that, when executed by a computing device having a processor and a memory associated with a search service, cause the computing device to perform a method of providing a comparison experience in response to a search query, the method comprising:
  receiving a search query from a user;
  determining that the user is engaging in a comparison task by classifying one or more entities of the search query; and
  providing a comparison experience to the user in response to determining that the user is engaging in a comparison task.

2. The one or more memory devices of claim 1, wherein the search query includes a first entity.

3. The one or more memory devices of claim 2, wherein determining that the user is engaging in a comparison task includes determining that the search query includes an explicit comparison call.

4. The one or more memory devices of claim 3, wherein the explicit comparison call includes a keyword that indicates that the user is searching for comparison information associated with the first entity and a second entity, wherein the search query includes a second entity that is different than the first entity.

5. The one or more memory devices of claim 2, wherein determining that the user is engaging in a comparison task further includes:
  associating the first entity with a first entity class;
  referencing an entity dictionary to identify that the entity dictionary includes a third entity associated with the first entity class, wherein the third entity is different than the first entity; and
  determining that the third entity had been extracted from a previous search query received from the user.

6. The one or more memory devices of claim 5, wherein determining that the user is engaging in a comparison task includes calculating a confidence interval that represents a likelihood that the user is engaging in a comparison task.

7. The one or more memory devices of claim 6, wherein the confidence interval is based on a number of times that entities associated with the first entity class have been extracted from search queries previously received from the user.

8. The one or more memory devices of claim 6, wherein the confidence interval is based on an amount of time between extraction of the third entity from the previous query received from the user and extraction of the first entity from the search query received from the user.

9. The one or more memory devices of claim 2, wherein the comparison experience includes a side-by-side display of comparison information associated with the first entity and another entity that is different from the first entity.

10. A computing device associated with a search service, wherein the computing device facilitates providing a computer implemented system that provides comparison experiences, the computing device comprising:
  a system bus;
  a communication connection coupled to the system bus, the communication connection connecting a network to the system bus, wherein a remote computer associated with a user communicates with the computing device associated with the search service via the network;
  a processor coupled to the system bus; and
  a memory coupled to the system bus, the memory having stored thereon computer-executable instructions that, when executed by the processor, cause the computing device to implement a plurality of components, the plurality of components comprising:
    an entity extraction component that extracts one or more entities from a search query submitted by the user;
    a classification component that associates each of the one or more extracted entities from the search query submitted by the user with at least one entity class;
    an inference component that determines a likelihood that the user is engaging in a comparison task, wherein the likelihood is represented by a confidence interval calculated by the inference component; and
    a comparison experience component that generates a comparison experience and provides the user access to the comparison experience, wherein a nature of access provided to the user is based on the confidence interval.

11. The device of claim 10, wherein the plurality of components further includes a learning component that analyzes historical behavior associated with the user and provides the results of the analysis to the inference component, which uses the results of the analysis to calculate confidence intervals in response to subsequent search queries received from the user.

12. The device of claim 11, wherein the learning component further analyzes historical behavior associated with a plurality of additional users and provides the results of the further analysis to the inference component, which uses the results of the further analysis in calculating a likelihood that particular query patterns indicate a likelihood that the user is engaging in a comparison task.

13. The device of claim 10, wherein the classification component references an entity dictionary to identify at least one entity class to which a first entity of the one or more extracted entities belongs.

14. The device of claim 10, wherein the comparison experience includes a side-by-side display of comparison information associated with the first entity and a second entity.

15. The device of claim 14, wherein the comparison information includes subjective comparison information and objective comparison information, and further wherein the subjective comparison information includes an aggregation of user reviews associated with an entity.

16. One or more memory devices storing computer-executable instructions that, when executed by a computing device having a processor and a memory, cause the computing device to perform a method of providing a comparison experience in response to a search query, the method comprising:
  receiving a first search query from a user;
  extracting a first entity from the first search query;
  updating an entity dictionary with data regarding the first entity, wherein the data regarding the first entity includes an indication of when the first search query containing the first entity was received;
  associating the first entity from the first search query with a first entity class;
  receiving a second search query from the user, wherein the second search query is received at some time after receiving the first search query from the user;
  extracting a second entity from the second search query;
  associating the second entity from the second search query with the first entity class;
  determining that the first entity from the first search query and the second entity from the second search query are not the same entity;
  generating a comparison experience in response to determining that the first entity from the first search query and the second entity from the second search query are not the same entity, wherein the comparison experience includes a side-by-side display of comparison information associated with the first entity from the first search query and the second entity from the second search query; and
  providing the comparison experience to the user.

17. The one or more memory devices of claim 16, further comprising determining that the first entity was previously extracted from the first search query received from the user.

18. The one or more memory devices of claim 17, further comprising determining a confidence interval representing a likelihood that the user is engaging in a comparison task when the user submits the second search query, wherein the confidence interval is calculated based on a history of the user's search activities pertaining to the first entity.

19. The one or more memory devices of claim 18, wherein the history of the user's search activities pertaining to the first entity includes data indicating a number of times that the first entity was extracted from a search query received from the user and an amount of time that has passed between extraction of the first entity from the first search query and receiving the second search query from the user.

20. The one or more memory devices of claim 19, further comprising determining whether the confidence interval is greater than a predetermined threshold, wherein if the confidence interval is not greater than the predetermined threshold, the method further includes:
   providing a selectable option for displaying the comparison experience, wherein the selectable option is provided on a search results page presented to the user in response to receiving the second search query; and
   receiving a user selection of the selectable option.

* * * * *